US008590357B2

(12) United States Patent
Takahashi (10) Patent No.: US 8,590,357 B2
(45) Date of Patent: Nov. 26, 2013

(54) METAL MANUFACTURING METHOD, APPARATUS OF THE SAME AND METAL OBJECT

(75) Inventor: Masaki Takahashi, Tokyo (JP)

(73) Assignee: Mokumeganeya Co., Ltd., Tokyo (JP)

( * ) Notice: Subject to any disclaimer, the term of this patent is extended or adjusted under 35 U.S.C. 154(b) by 303 days.

(21) Appl. No.: 12/944,411

(22) Filed: Nov. 11, 2010

(65) Prior Publication Data

US 2011/0113849 A1     May 19, 2011

(30) Foreign Application Priority Data

Nov. 13, 2009   (JP) ................................. 2009-259573
Jun. 11, 2010   (JP) ................................. 2010-134052

(51) Int. Cl.
*B21D 11/14*     (2006.01)
(52) U.S. Cl.
USPC ................. 72/371; 72/65; 72/185; 29/896.4; 29/896.43
(58) Field of Classification Search
USPC ........ 72/364, 371, 342.1, 185, 186, 203, 204, 72/64, 65; 29/896.4, 896.43
See application file for complete search history.

(56) References Cited

U.S. PATENT DOCUMENTS 450,412 A  *  4/1891  Knight ...................... 29/896.43
3,165,825 A  *  1/1965  Barney ...................... 29/896.43

FOREIGN PATENT DOCUMENTS

| JP | 54-36593 | | 3/1979 |
| JP | 6-7210 | A | 1/1984 |
| JP | 10-014623 | A | 1/1998 |
| JP | 2006-102762 | A | 4/2006 |

OTHER PUBLICATIONS

International Search Report for PCT Patent App. No. PCT/JP2010/006497 (Feb. 15, 2011).
English translation of Written Opinion for PCT Patent App. No. PCT/JP2010/006497 (Feb. 15, 2011).

* cited by examiner

*Primary Examiner* — Dana Ross
*Assistant Examiner* — Pradeep C Battula
(74) *Attorney, Agent, or Firm* — Cermak Nakajima LLP; Tomoko Nakajima (57) ABSTRACT

When manufacturing a ring and a pendant from a single metal plate, the number of the twist is determined so that a predetermined feature pattern may occurs regardless size on the surface of a male ring and a female ring. The feature pattern depends on the method of the laminating of two or more metal plates, the kind of metal plate, thickness, etc. for example. The number of times of twist concerned is determined based on these information.

9 Claims, 8 Drawing Sheets

FIG.5 AFTER PATTERN FORMATION STEP ST19

FIG.6

AFTER EXTENDING STEP (ST20)

FIG.7

AFTER CUTTING STEP (ST21)

FIG.8

AFTER EXTENDING STEP (ST22)

METAL MANUFACTURING METHOD, APPARATUS OF THE SAME AND METAL OBJECT

This application is claims priority under 35 U.S.C. §119 to Japanese Patent Application Nos. 2009-259573, filed Nov. 13, 2009, and 2010-134052, filed Jun. 11, 2010, which are incorporated in their entireties by reference.

FIELD OF INVENTION

This invention relates to a metal object manufacture method which forms metal object by processing metal object obtained laminating of two or more metal plates which the quality of the materials differ, a apparatus of the same, and a metal object manufactured by the metal object manufacture method.

BACKGROUND

Mokumegane is a special metalworking technology which Japan is proud of in the world. The special processing process exceeds the frame of mere technology, and reaches even an ideological and mental domain called the dialog of a material and a producer.

After carrying out the lamination and joint of the metal plates with which colors differ and twist processing, the surface is carved by chisel or the drill-like tool, then "mokme" patterns are formed on the surface by forging into palate with hammer.

By the way, when manufacturing a ring, a pendant, etc. of a pair by the mokumegne technique, there is a request for forming the feature pattern common to a pair rings and a pendant, etc.

In a prior art, the manufacturing process of the metal plate used for pair rings or a pendant is not managed systematically, and each craftsman manufactures based on experience. Therefore, there is a problem that it is difficult to increase the number of manufacturers and the number of products.

SUMMARY OF THE INVENTION

This invention is made in view of this situation, and the purpose of the present invention is to provide a metal object manufacture method which can manage systematically a manufacture processing when manufacturing a plurality of metal object on which common features pattern from a origi­nal metal plate occurres, an apparatus of the same, and a metal object manufactured by the method.

First invention is a metal manufacturing method compris­ing:

an interval specification step which specifies the interval of the feature pattern which is repeatedly produced on a plurality of the metal objects by a twist processing and, when manu­facturing a plurality of metal objects by cutting a plurality of laminated metal plates after twisting processing;

a determination step which determines a number of times of twist performed at the twist processing based on a length of the a plurality of metal objects in a direction of rotation axis of the twist processing and the interval specified at the interval specification step;

a lamination step which laminates the plurality of metal plates;

a junction step which joins the plurality of metal plates laminated by heating and pressurizing;

a twist step which performs twist processing to the plural­ity of metal plates joined at the junction step by heating so that inversions of back and front of the number of times of twist determined at the determination step occurs;

a plate formation step which forms a metal plate by pro­cessing the plurality of metal plates into a shape of plate; and a cut step which cuts the metal plate formed at the plate formation step into a plurality of the metal objects.

Second invention is a metal manufacturing apparatus com­prising:

an interval specification means which specifies the interval of the feature pattern which is repeatedly produced on a plurality of the metal objects by a twist processing and, when manufacturing a plurality of metal objects by cutting a plu­rality of laminated metal plates after twisting processing;

a determination means which determines a number of times of twist performed at the twist processing based on a length of the a plurality of metal objects in a direction of rotation axis of the twist processing and the interval specified at the interval specification means;

a lamination means which laminates the plurality of metal plates;

a junction means which joins the plurality of metal plates laminated by heating and pressurizing;

a twist means which performs twist processing to the plu­rality of metal plates joined by the junction means by heating so that inversions of back and front of the number of times of twist determined by the determination means occurs;

a plate formation means which forms a metal plate by processing the plurality of metal plates into a shape of plate; and a cut means which cuts the metal plate formed by the plate formation means into a plurality of the metal objects.

Third invention is a meta 1 object which is manufactured by a manufacturing method, the method comprising:

an interval specification step which specifies the interval of the feature pattern which is repeatedly produced on a plurality of the metal objects by a twist processing and, when manu­facturing a plurality of metal objects by cutting a plurality of laminated metal plates after twisting processing;

a determination step which determines a number of times of twist performed at the twist processing based on a length of the a plurality of metal objects in a direction of rotation axis of the twist processing and the interval specified at the interval specification step;

a lamination step which laminates the plurality of metal plates;

a junction step which joins the plurality of metal plates laminated by heating and pressurizing;

a twist step which performs twist processing to the plural­ity of metal plates joined at the junction step by heating so that inversions of back and front of the number of times of twist determined at the determination step occurs;

a plate formation step which forms a metal plate by pro­cessing the plurality of metal plates into a shape of plate; and a cut step which cuts the metal plate formed at the plate formation step into a plurality of the metal objects.

DETAILED DESCRIPTION OF THE INVENTION

Hereafter, an embodiment of the present invention will be explained with reference to the drawings.

The present embodiment explains the case where a ring for male (an example of the first metal object of the present invention), a ring for female (an example of the second metal object of the present invention), and a pendant (an example of the third metal object of the present invention) having the same feature part are manufactured by mokumegane technology.

In the present embodiment the ring for male 2, the ring for female 4 and the pendant 6 are manufactured from a single metal plate 14 manufactured by mokumegane technology.

Figure 1:
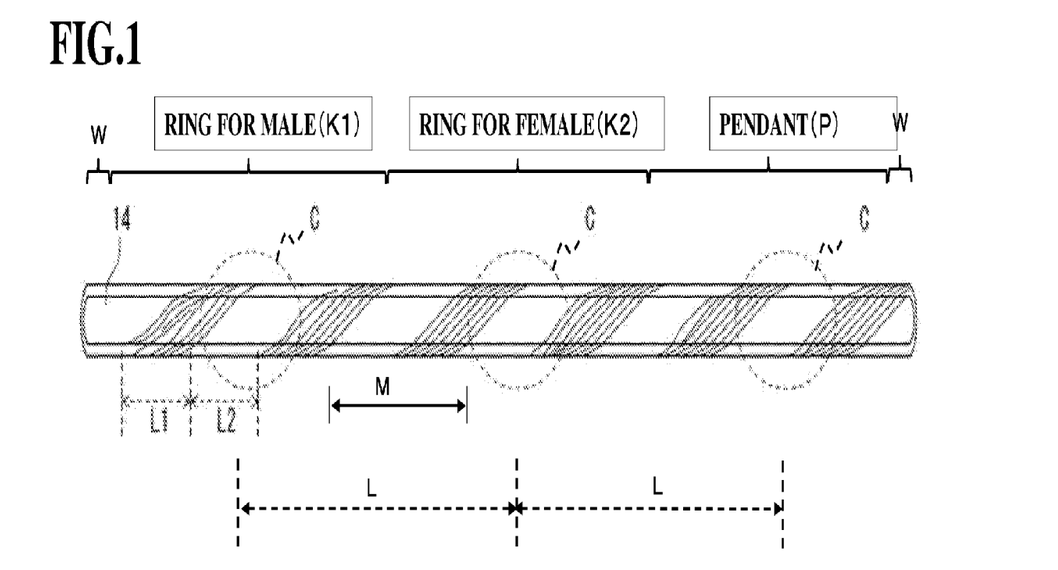
FIG. 1 is a figure of an appearance of a metal plate 14 showing a state before cutting and used for calculation of the number of time of twist.

For example, as shown in FIG. 1, a domain used as the ring for male, a domain used as the ring for female and a domain used as the pendant are formed in order in a single body. Each parts are obtained by cutting boundary positions of the domains.

FIG. 1 shows the appearance of the front of the metal plate 14 showing a state before cutting and used for calculation of the number of times of twist mentioned later.

Figure 2:
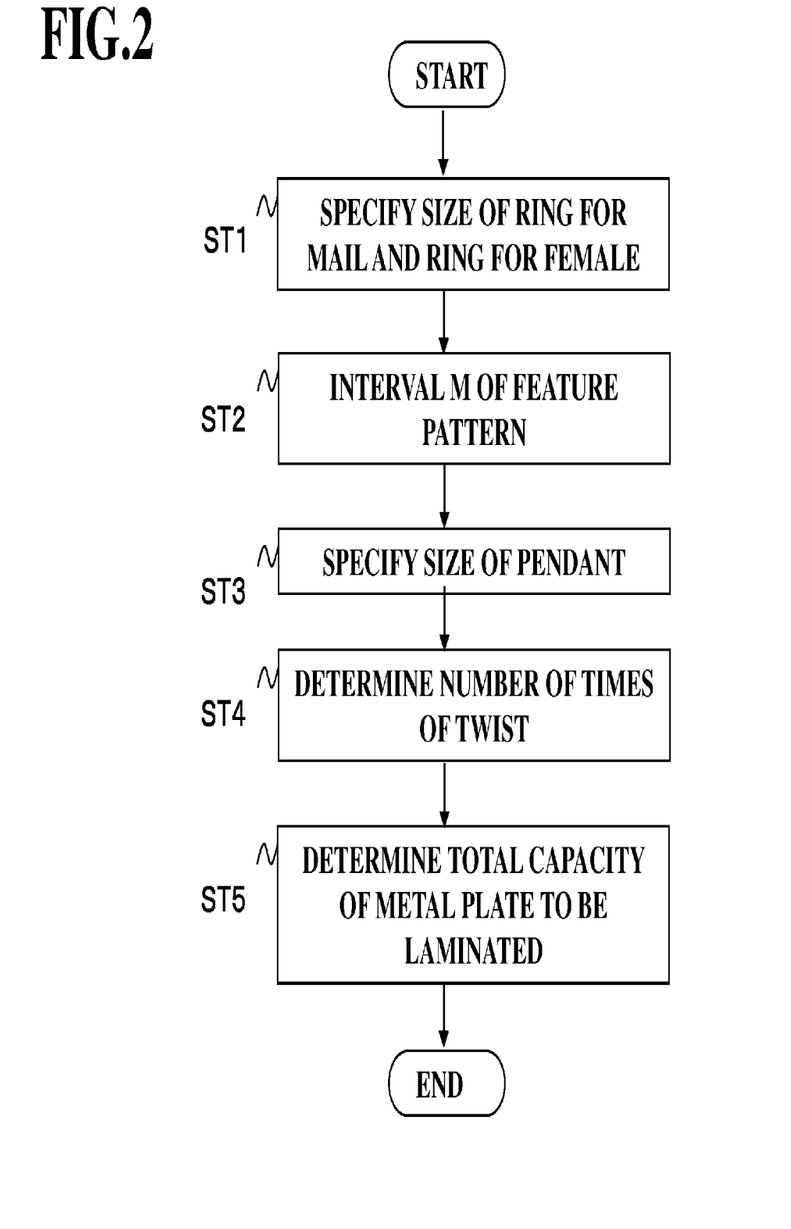
FIG. 2 is a flow chart for explaining the procedure of determining various kinds of parameters for manufacturing the ring for males, the ring for female, and a pendant.

FIG. 2 is a flow chart for explaining the procedure of determining various kinds of parameters for manufacturing the ring for males 2, the ring for female 3, and a pendant 4 which are calculated as follows:

The ring for males 2: $K1$ (length)$\times D12$ (width)$\times E12$ (thickness)

The ring for females 3: $K2$ (length)$\times D12$ (width)$\times E12$ (thickness)

The ring for pendant 4: $K3$ (length)$\times D3$ (width)$\times E3$ (thickness)

Hereafter, each step and the details will be explained.

Step ST1:

A size (length) K1 of the direction of the circumference of the ring for males, a size K2 of the ring for female, a width D12 and a thickness E12 finally obtained are determined or specified according to directions from a user.

Step ST2:

Interval M of a feature pattern in a longitudinal direction is determined. The feature pattern is repeatedly occurred by twist on the ring for male and the ring for female finally obtained. The interval M is determined by a design and the request from a customer, for example.

Moreover, the main position of the surface of a male ring and the main position of the surface of a female ring on a square pole (rod) before cutting are determined.

Step ST3:

A length K3, a width D3, and a thickness E3 of a pendant are determined or specified according to directions from a user.

Step ST4:

The metal plate 14 includes the length K1, K2,) and "W" as shown in FIG. 1, "W" is a length which is converted into a length of an end portion at the time of the twist which is omitted in a later step as an unnecessary portion and which has a section ($D12 \times E12$) of a final ring. That is, "W" is a length obtained by performing division of the volume of the end concerned by a section ($D12 \times E12$).

Further, "P" is a length of a pendant which is converted in a length of the section ($D12 \times E12$) of the final ring. "$K3 \times D3 \times E3$" in the following equation (1) shows a volume of the potion which forms pendant 4 in later step. And the number of times V of a twist is computed by the following formula (1) and (2). The portion of the length "P" forms the pendant 4 in a later step.

(Formula 1)

$$P = K3 \times D3 \times E3 / (D12 \times E12) \quad (1)$$

(Formula 2)

$$V = \{(K1 + K2 + P) - 2W\}/S \quad (2)$$

Note that, the size "S" is the size "M" by which the common feature pattern (for example, the part of a lamination part) by twist processing occurs in the main position (a predetermined position, for example center) of the surface of a male ring and the main position of the surface of a female ring which are finally obtained and the common feature pattern occurs to a part of portion used as the pendant. The size "S" is determined by user depending on the position of the common feature pattern. The common feature pattern is formed by the some of the feature pattern.

Here, the feature pattern and the generating interval M of the pattern depend on the method of lamination of two or more metal plates, for example, the kind of metal plate, thickness, etc. The number of times of the twist is determined based on these information.

A ratio of the distance L1 of a longitudinal direction of the pattern which specifically comprises a lamination portion for forming the feature pattern, and a distance L2 of the pattern which comprises a non-laminating portion is the same as the aspect ratio of the section of the angle stick component before the twist process. Moreover, the number and the distance M of the feature pattern are determined by the number of times of twist.

Then the number of times of the twist is determined based on the information so that the common pattern C is formed on a center position of the surface of the specified ring for male, a center position of the surface of the specified ring for female and at least on a part which is formed to the pendant.

In addition, as shown in FIG. 1, the interval of Pattern C is set to L.

Step ST5:

The total capacity of the ring for males, the ring for female, and the pendant finally manufactured from the size of step ST1 and ST3, is determined, and the total capacity (gross weight) Z of the plates laminated based on it is determined as following (3).

(Formula 3)

$$Z = (K1 + K2) \times D12 \times E12 + K3 \times D3 \times E3 + W \times D12 \times E12 \quad (3)$$

By determining the number of times of twist in the procedure shown in FIG. 1, the feature pattern finally independently formed in the rings can be made the same among any size of rings. Consequently it can avoid that different image is obtained due to the change of feature pattern caused by the difference of the size of the rings.

Further, the common feature pattern can be occurred correctly on a metal plate at the position where used as the ring for males, the ring for female, and a pendant.

As a result, a desired design can be formed in high accuracy on the ring for males, the ring for female, and pendant, and the probability of occurring fault in manufacture will be reduced.

Below the step which manufactures the ring for males, the ring for female and a pendant based on various kinds of parameters determined in the procedure shown in FIG. 1 will be explained.

Figure 3:
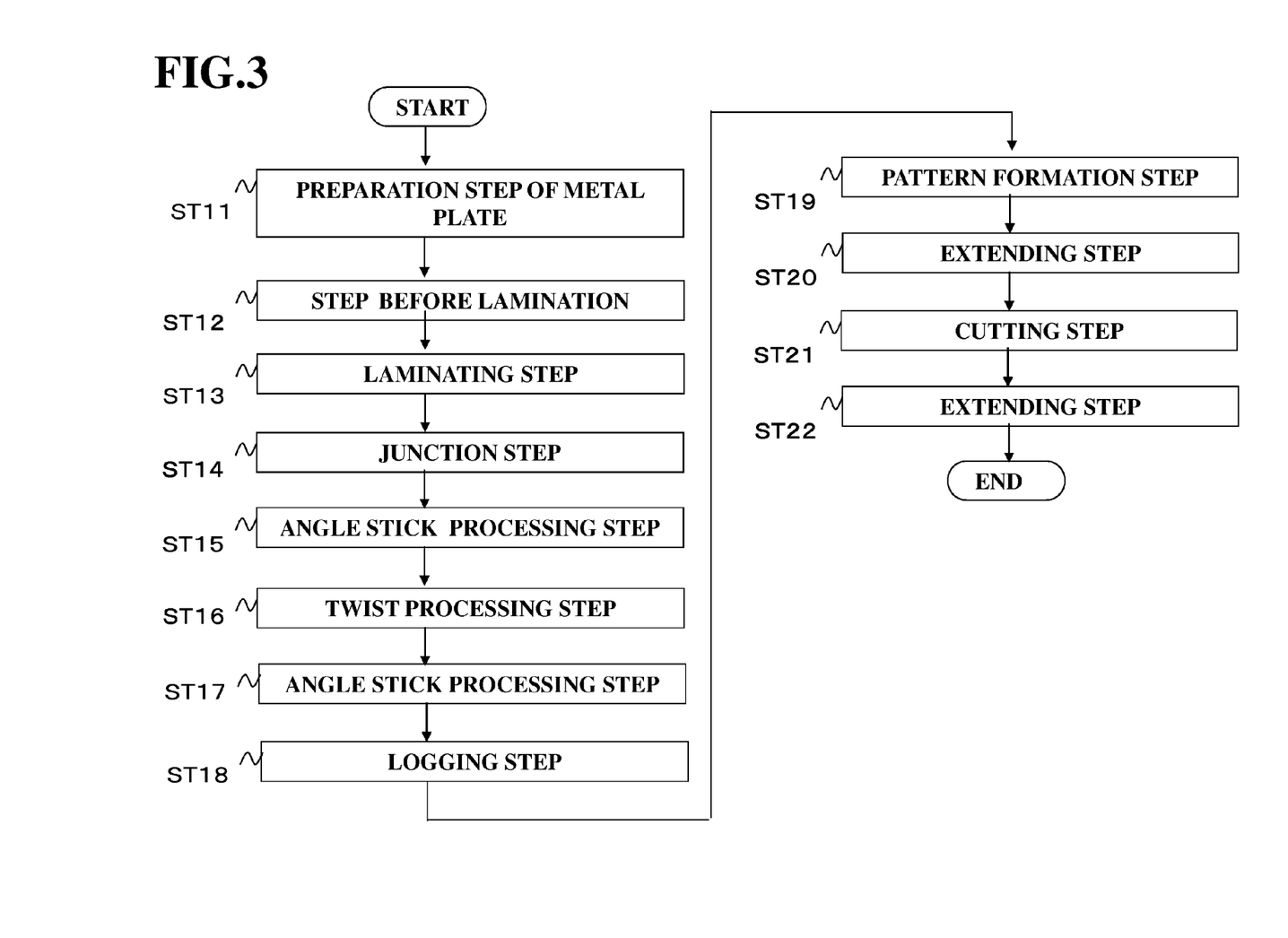
FIG. 3 is a figure for explaining a manufacturing process for the ring for males, the ring for women, and pendant of an enforcement form of this invention.

FIG. 3 is a figure for explaining a manufacturing step for the ring for male, the ring for female and pendant of the embodiment of the present invention.

All or a part of the following steps are performed with a machine or hands.

[Preparation Step of a Metal Plate (Step ST11)]

Two or more metal plates with which the quality of the materials differ are prepared.

15 sheets of the metal plates are prepared in the present embodiment.

As the material of a metal plate, platinum (Pt), gold (Au), silver (Ag), copper (Cu), titanium (Ti), iron (Fe), nickel (nickel), stainless steel, tantalum (Ta), or these mixtures are used.

Two or more metal plates 11 comprises the quality of the material different, respectively, and character recognized visually, such as a color and a degree of gloss, differs. The thickness of a metal plate 11 is about 0.1 to 1.0 mm. In addition, there should just be at least two kinds of metal plates 11 with which the quality of the materials differ. Moreover, the same quality of the material may be used for the two or more metal plates among two or more metal plates 11.

[Step Before Lamination (Step ST12)]

Next, two or more metal plates 11 are ground as processing before junction using sandpapers No. 600, No. 800, No. 1000, No. 1200, No. 1500, etc. Then, charcoal grinding is used together and the surface is finished uniformly carefully.

[Laminating Step (Step ST13)]

Next, a multilayer metal object in which a two or more metal plates are laminated by laminating two or more metal plates 11 and joining metal plates 11 is formed. The multilayer metal object is an example of two or more metal plates of the present invention. At this time, the amount of laminating is determined based on the total capacity (gross weight) Z computed at Step ST5 shown in FIG. 2.

Here, as order of laminating, it is determined in consideration of a final design (feature pattern).

At this time, each of a metal plate 11 is 0.05 to 0.2 mm, and the form of the multilayer metal object is 1.0 to 2.0×40 to 60×60 to 80 mm.

[Junction Step (Step ST14)]

Junction of metal plates 11 is performed by attaching the metal plates 11 and giving pressure in a way in which the plastic deformation of the metal plate 11 does not occurred as possible in the temperature conditions below the melting point of the metal plate 11. This is diffusion junction joined using diffusion of the atom produced between the junction sides of metal plates 11.

The conditions at the time of performing diffusion junction are as follows. Namely, it carries out by heating and pressurizing between 500 and 1200 degrees C. and between 200 and 500 kgf/cm2. In addition, junction of the metal plates 11 is performed using wax.

Diffusion combination will be explained.

When approaching and pressurizing the surfaces of metals to the grade which attains to an atomic level mutually, a metallic bond will start. It is supposed that it is possible to join by sticking two metals in a principle.

In the present embodiment, the metals having different color are combined in the state of a solid phase by using the means of heating and pressurization based on the principle of this diffusion combination. In short, metal is not melted and it is made to join together in the state of a solid.

[Angle Stick Processing Step (Step ST15)]

Figure 4A:
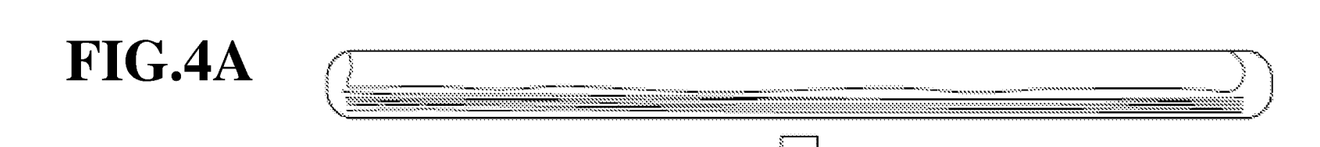
FIGS. 4A-4C are figures for explaining the state of the component after step ST13, ST16 and ST17 shown in FIG. 3.

Next, after inspecting details and removing imperfect portion of the lamination, as shown in FIG. 4A, for example, it is extended to the angle stick shape of 4.8 to 6.0×4.8 to 6.0 mm of sections using a roller.

In the present embodiment, the rate of extend in a lengthwise direction and a transverse direction adjustable by performing rolling processing to a plate with a roller. The angle stick is presumed on the basis of the monotonous volume of the result, and a balance suitable for performing twist processing is selected.

Thus, the angle stick processing is performed before a twist processing step because the ratio of the distance L1 of the direction of a longitudinal direction of the pattern which comprises a lamination portion of the metal angle stick 14 shown in FIG. 1 and the distance L2 of the pattern which comprises a non-laminating portion are determined by the aspect ratio of the angle stick component after processing.

That is, the ratio with the distance L1 and L2 of metal angle stick 14, i.e., a design, can be adjusted by performing angle stick processing before twist processing.

[Twist Processing Step (Step ST16)]

Figure 4B:
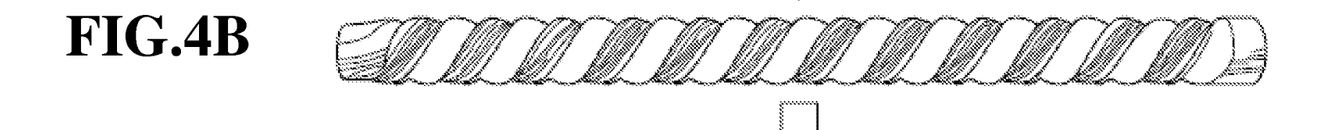

Next, as shown in FIG. 4B, twist processing performs two or more reversion of face side and reverse side.

Heating and annealing are repeated and twist processing is given little by little while taking care the lamination order so that two or more reversions occurs in the angle stick after forge fabrication. At this time, the twist process while heating, a cooling process, and an annealing process are repeated successively.

In the present embodiment, twist processing of the number of times V determined at step ST4 of FIG. 2 is performed. Thereby, regardless of the size of a ring, the feature pattern finally independently formed on a ring can be made the same. Therefore it can avoid that image will be different because of a change of the feature pattern due to the difference of the ring size.

Moreover, as shown in FIG. 1, the common pattern C occurs on the main position of the surface of the male ring 2, the main position of the surface of the female ring 3 and at least a part of pendant 4 in the metal object 14 before cutting mentioned later.

[Angle Stick Processing Step (Step ST17)]

Figure 4C:
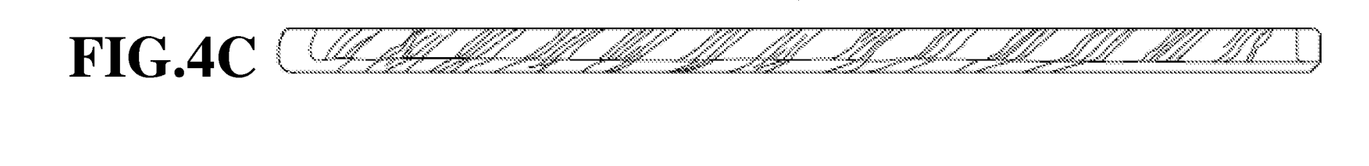

Next, the component which passed through the twist processing step as shown in FIG. 4C is processed with extend processing by using roller to the angle stick shape of 3.8 to 5.0×3.8 to 5.0 mm of section.

In the present embodiment, the shape of section is made smaller than the component obtained by step ST15 in order to adjust so that an actual finish size may be suited.

Further a target of pattern formation can be made a plane by processing to the angle stick shape before pattern formation, and it becomes easy to form a pattern.

[Logging Step (Step ST18)]

Next, only capacity required for formation of rings and a pendant is logged from the angle stick obtained by step ST17. This capacity for logging should be determined by step ST5 of FIG. 2.

In the present embodiment the angle stick whose cross-section area is clear is obtained in the step ST17. Therefore the length for logging can be easily determined based on the capacity determined by step ST5, and the cross-section area of an angle stick component.

[Pattern Formation Step (Step ST19)]

Figure 5:
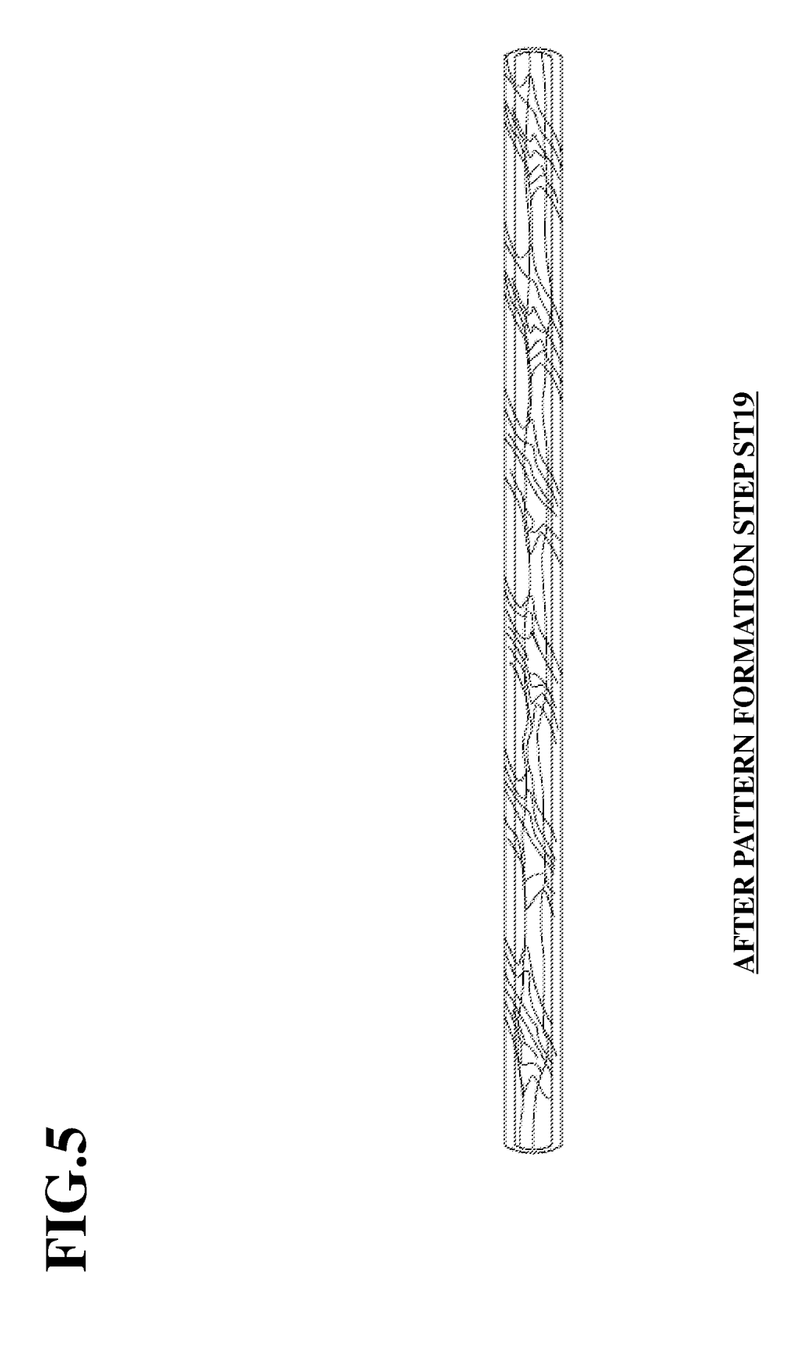
FIG. 5 is a figure for explaining the state of the component after step ST19 shown in FIG. 3.

Next, as shown in FIG. 5, predetermined patterns, such as a character, a sign, and a figure are formed on the surface of the angle stick material.

Formation of the patterns is performed by carving using a chisel or a drill-like tool. At this time, patterns which comprise the pattern C are formed on the male ring 2, the female ring 3, and pendant 4 which were formed on the metal object 14.

For example, carve processing and lowering processing is performed using a chisel or a drill-like tool to the depth more than half of the lamination after twist processing.

The angular stick material which is processed with a twist processing is extended using the roller until it became the thickness below about half.

[Extending Step (Step ST20)]

Figure 6:
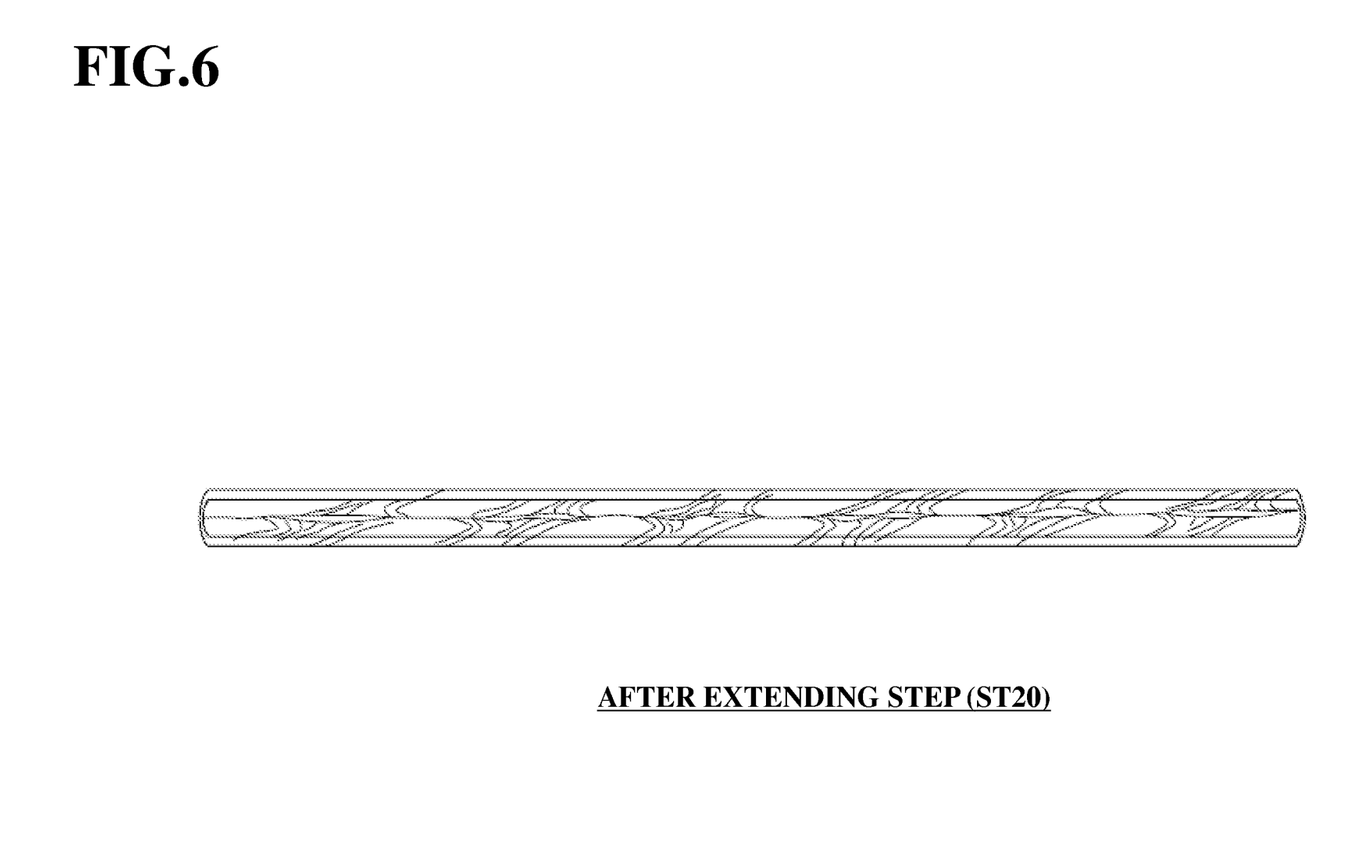
FIG. 6 is a figure for explaining the state of the component after step ST20 shown in FIG. 3.

Next, as shown in FIG. 6, the angular stick material on which the pattern is formed by step ST19 is extended in the length direction so that it may become a predetermined thickness.

A metal object is extended by inserting the angular stick material between two rollers which are installed rotatably by keeping a predetermined interval and pressing. Thereby, a metal object is extended to about 1.0 to 2.4 mm.

[Cutting Step (Step ST21)]

Figure 7:
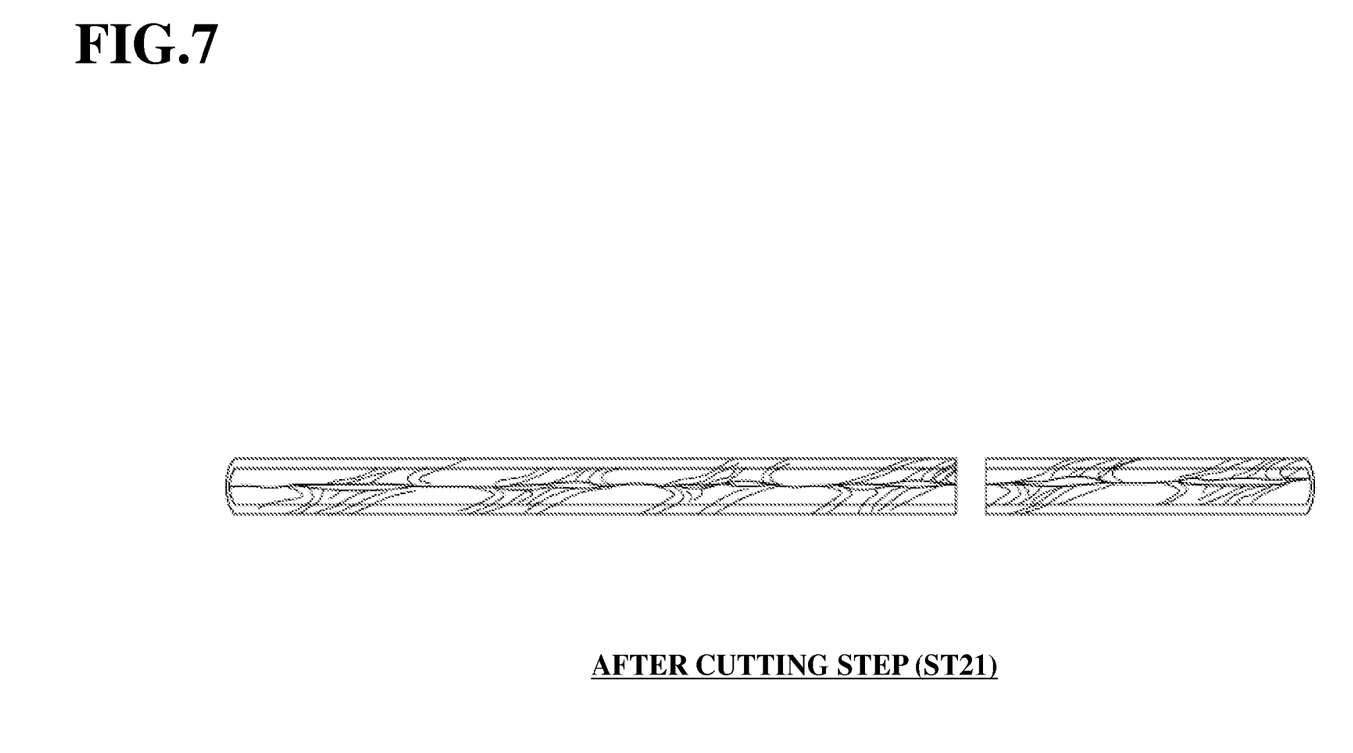
FIG. 7 is a figure for explaining the state of the component after step ST21 shown in FIG. 3.

After this, as shown in FIG. 7, a metal plate is cut into two objects which are a ring and a pendant 4.

[Extending Step (Step ST22)]

Figure 8:
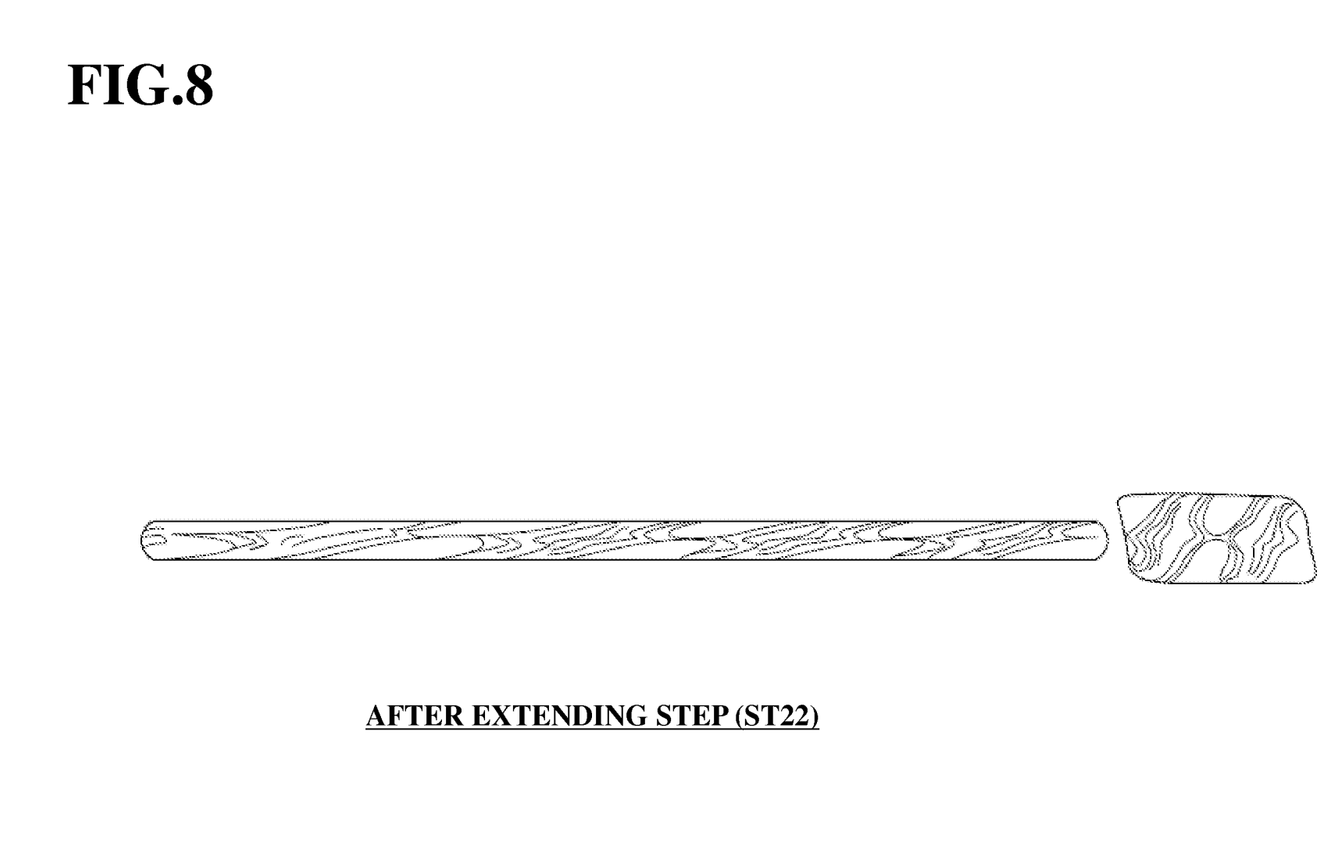
FIG. 8 is a figure for explaining the state of the component after step ST22 shown in FIG. 3.

Next, as shown in FIG. 8, the ring cut at step ST21 is extended in the length direction so that it may become a predetermined thickness. Further, the pendant cut at Step ST21 is extended in the length direction and the width direction so that it may become a predetermined thickness. Thereby, it is extended to about 0.4 to 1.0 m.

In a final design, the design by a lamination part and the design by a pattern are occurred in harmony.

And the portion of a ring is cut in the ring 2 for males, and the ring 3 for female, and it is processed into a shape of a ring. Moreover, a chain etc. is attached to the portion of the pendant.

As explained above, the manufacturing step of the ring 2 for males, the ring 3 for females and a pendant 4 are systematically manageable by manufacturing a metal plate 14 in the procedure mentioned above in the present embodiment.

Therefore, regardless the difference of the ring size, it can make the feature pattern finally formed on the ring same. It can avoid that different image occurs by a change of the feature pattern originated in a difference of the sizes.

Further, the ring 2 for males, the ring 3 for females and pendant 4 on which the common feature pattern C occurs at proper position can be manufactured by high probability, and the number of inferior goods can be reduced.

Further, the number of manufacturers can be increased easily and the number of products which can be manufactured can be increased.

This invention is not limited in the embodiment mentioned above. Namely, regarding the component in the embodiment mentioned above, a person skilled in the art can do various changes, combination, sub-combination and substitution in the technical or equivalent scope of this invention.

Although the case where two rings and pendants were formed from a single metal object is explained in the present invention mentioned above, this invention can be applied also when forming two or more objects for wearing other than these from a single metal object.

A ring, a pendant, a necklace, an earring, cuffs, a brooch, a tie tack, a van guru, a buckle, a choker, a bracelet, etc. may be used as a meta 1 object.

Moreover, this invention is applicable to a knife, a sword, a spoon, the jewel box made from the precious metals, the flower vase made from the precious metals, a compact, a clock, smoking tools, etc., for example.

Further, any of the number of sheets of a metal plate 11, thickness, etc. may be used.

This invention may perform extending step simultaneously when performing pattern formation step ST19.

Further, cutting of a ring and a pendant may be performed at the time of the process of the extending step of step ST20.

The invention claimed is:

1. A metal manufacturing method of manufacturing a plurality of metal objects from a single metal plate, the method comprising:
    an interval specification step which specifies the interval of the feature pattern which is repeatedly produced on a plurality of metal objects by a twist processing and, when manufacturing the plurality of metal objects by cutting a plurality of laminated metal plates after twisting processing;
    a determination step which determines a number of times of twist performed by the twist processing based on a length of the a plurality of metal objects in a direction of rotation axis of the twist processing and the interval specified at the interval specification step;
    a lamination step which laminates the plurality of metal plates;
    a junction step which joins the plurality of metal plates laminated by heating and pressurizing;
    a twist step which performs twist processing to the plurality of metal plates joined at the junction step by heating so that inversions of back and front of the number of times of twist determined at the determination step occurs;
    a plate formation step which forms a metal plate by processing the plurality of metal plates into a shape of plate; and
    a cut step which cuts the metal plate formed at the plate formation step into a first and second metal objects having a common shape of section which intersects perpendicularly in an rotation axis direction and on which a feature pattern having the specified interval,
    wherein the cut step further includes cutting the metal plate into a third metal object having shape of a section which is different from the section of the first metal object, from the plurality of metal plates laminated,
    the determination step calculates the number of times of twist by dividing
    a total length of a length of a direction of the circumference of the first object and the second object having a predetermined section, a length of a portion which forms an end portion at the time of the twist step which is omitted as an unnecessary portion and which is converted into the section
    by the specified interval by which the feature pattern is formed on the predetermined position of the first object, the second object and the third object.

2. A metal manufacturing method as set forth in claim 1, wherein
    the determination step performs the processing for subtracting a length obtained by dividing a volume of portion which is not used for the first metal object, the second metal object and the third metal object among the plurality of laminated metal plates by a section area of the first metal object from the total length, and calculating the number of times of twist by dividing the result of the subtraction by the specified interval.

3. A metal manufacturing method as set forth in claim 1, further comprising
a pre-twist step which processes the plurality of the metal plates joined at the junction step to produce an angle stick component,
wherein the twist step performs twist processing to the angle stick component obtained at the pre-twist step.

4. A metal manufacturing method as set forth in claim 3, wherein
the feature pattern comprises a first pattern that the cross-sectional pattern of the plurality of metal plates laminated produced, and the second pattern that the cross-sectional pattern has not produced,
the pre-twist step processes to produce the angle stick component having a cross-sectional aspect ratio according to the ratio of the length of the first pattern and the second pattern in the direction of a rotation axis of the twist.

5. A metal manufacturing method as set forth in claim 4, further comprising a post-twist step which produces the angle stick component after the twist step, and
a pattern formation step which forms a pattern to the angle stick component produced at the post-twist step,
wherein the plate formation step produces the metal plate by processing to the angle stick component on which the pattern has formed.

6. A metal manufacturing method as set forth in claim 5, wherein
the junction step determines a pressurization temperature based on a thermal expansion coefficient of a stainless steel component so that a predetermined pressurization power may be acquired by pressurizing the plurality of metal plates laminated from both sides by the stainless steel component.

7. A metal manufacturing method as set forth in claim 6, further comprising an abrasive step which grinds the plurality of the metal plates to makes a surface state uniform, wherein the lamination step laminates the plurality of the metal plates ground at the abrasive step.

8. A metal manufacturing method as set forth in claim 6, wherein
the twist step repeats successively the twist processing while heating, and a cooling step.

9. A metal manufacturing method as set forth in claim 6, wherein
when forming a first ring, a second ring and any of object from the plurality of metal plates laminated as the metal object,
the interval specification step specifies a position near center of a first portion which becomes the first ring of the plurality of the metal plates laminated, and a position near center of a second portion which becomes the second ring and a position of third portion which becomes the any of object as a position on which the feature patterns are formed.

\* \* \* \* \*